United States Patent [19]

Brandin

[11] Patent Number: 5,193,176
[45] Date of Patent: Mar. 9, 1993

[54] COMPUTER WORK SAVING DURING POWER INTERRUPTION

[75] Inventor: Christopher L. Brandin, Sedalia, Colo.

[73] Assignee: Powercard Supply C.A., Caracus, Venezuela

[21] Appl. No.: 599,098

[22] Filed: Oct. 17, 1990

[51] Int. Cl.$^5$ .................. G06F 11/00; G06F 11/30
[52] U.S. Cl. ........................... 395/575; 371/66
[58] Field of Search ............. 364/200, 900; 371/66

[56] References Cited

U.S. PATENT DOCUMENTS

| | | | |
|---|---|---|---|
| 4,327,410 | 4/1982 | Patel | 364/200 |
| 4,458,307 | 7/1984 | McAnlis | 371/66 X |
| 4,757,505 | 7/1988 | Marrington | 371/66 |
| 4,812,677 | 3/1989 | Perry | 371/66 X |
| 4,907,150 | 3/1990 | Arroyo | 364/200 |
| 4,959,774 | 9/1990 | Davis | 371/12 X |
| 5,012,406 | 4/1991 | Martin | 371/66 X |

Primary Examiner—Robert W. Beausoliel, Jr.
Assistant Examiner—Ly V. Hua
Attorney, Agent, or Firm—Helfgott & Karas

[57] ABSTRACT

A computer having both volatile and nonvolatile memory, and which is operative in response to a system program and an application program, is protected against an interruption of a primary power source by a momentary introduction of power from a backup source, and by a freezing of data and program instructions in effect at the time of the power interruption. A backup region is designated within the nonvolatile storage medium for receipt of data and instructions present in the nonvolatile memory upon the occurrence of a power interruption. Circuitry is provided for sensing the interruption, the circuitry including the implementation of a computer program which directs cessation of further operation of the application program followed by a transfer of data and instructions from the volatile memory to the nonvolatile memory. This transfer is done under backup power. Thereupon, the backup power is discontinued and the computer is shut down. Subsequently, after resumption of primary power and, upon request of an operator of the computer, the data and the instructions are returned from the nonvolatile memory to the volatile memory, and running of the application program is resumed from the stage at which it had been previously frozen.

26 Claims, 8 Drawing Sheets

COMPUTER WORK SAVING DURING POWER INTERRUPTION

BACKGROUND OF THE INVENTION

This invention relates to computers protected against loss of primary electric power and, more particularly, to a rapid controlled power-down while freezing an application program stage and work product for resumption at a future time.

Computers are utilized in numerous locations, including the home and industry, and are powered by electricity which is obtained, normally, from electric power lines provided by an electric power company. There are times, such as during an electrical storm, by way of example, when electric power may be interrupted unexpectedly. The interruption of power may occur while a human operator is entering data as by a keyboard, to the computer as in a word processing program. Or, by way of further example, the interruption in power may occur while the computer is performing a lengthy mathematical procedure, such as the inversion of a matrix, or the calculation of pixel data in the display of a rotated view of complex machinery or other subject matter in a program for computer-aided design. It is important to provide the computer with some sort of backup power so as to save the computer operator from the inconvenience of lost data and the possible need to redo a lengthy project.

One solution to the problem brought on by an interruption of electric power is to employ a bank of large batteries, such as automotive batteries, which have sufficient stored energy to operate the computer for many hours, so as to allow the operator to complete his or her work on the computer. The batteries are connected through suitable power circuitry which enables battery power to be applied to the computer instantaneously upon the loss of the primary power so as to insure the absence of any transient response in the computer during a switching from primary power to backup power. While such an arrangement of large batteries can insure proper operation of the computer during a power interruption, the presence of the bank of batteries would present, in many situations, an undesirable burden both in terms of space requirements and in terms of the necessity for maintaining the batteries in a proper state of electrical charge.

It is recognized that, in most situations, it is not necessary to provide a long term supply of back-up power because many power interruptions persist for less than a minute, or possibly for several minutes. A power outage lasting for one or more days is rare.

Therefore, the major concern in protecting a computer from a power interruption is the need to preserve data which has been generated during the running of an application program, and to reserve the stage of operation of the program, as in the foregoing examples of the inversion of a matrix or the rotation of a view, so that the operator of the computer can resume use of the computer at a convenient time subsequent to the resumption of the electric power. It is also recognized that, by use of a power-down procedure employing no more than a minimal amount of time, the amount of energy which must be stored for backup power is minimized, thereby avoiding the use of excessively heavy and bulky batteries. Indeed, if the power-down procedure could be accomplished within a matter of seconds, then the back-up power could be provided by relatively small rechargeable batteries which could be mounted conveniently within the computer itself. With such a construction, the computer could be manufactured with its own protection against power interruption, and would provide the operator with the facility for resuming the computer operation at the same point where the computer operation stopped at the onset of the power outage.

Presently available equipment for protection of computers from power interruptions does not provide the foregoing type of protection. By way of example, external batteries are required to provide an adequate reserve of electric energy for use during a power-down procedure. Also, external storage apparatus for storing data from the computer is employed during a power outage. Also, proposed power-down systems contemplate the closing of application programs in use by the computer prior to shutting down the computer. This can entail a significant amount of time in the situation where a person may be operating simultaneously with a word-processing program, a spread-sheet program, a graphics program, and a mathematical program. Furthermore, upon the resumption of computer activity after restoration of the power, it would be necessary for the operator to reopen all of these programs, and to reestablish the various stages in the operations of these programs to resume the work procedure at the point at which the work was previously terminated. This presents a considerable inconvenience to the operator.

SUMMARY OF THE INVENTION

The aforementioned problem is overcome and other advantages are provided by an apparatus and procedure for implementing an orderly power-down of a computer upon the occurrence of an interruption of the primary power to the computer. In accordance with the invention, it is recognized that various parts of the instructions of an application program may be stored in the volatile random-access memory (RAM), and a count of program steps in a lengthy sequence of steps may be maintained in a register or the RAM of the central-processing unit (CPU) of the computer during operation of the application program. Furthermore, data generated by the computer during operation of the application program, such as partial products and partial sums of a mathematical operation may also be stored temporarily in a register or RAM of the CPU during operation of the application program.

In accordance with an important feature of the invention, the operation of the computer is frozen at the point in time of the power interruption by storing all of the foregoing data in a nonvolatile storage medium. Also, other aspects of the program such as the aforementioned program count and instructions in the RAM are also transferred to the nonvolatile storage medium upon the inception of the power interruption. This is accomplished during the use of backup power. Thereafter, the computer is shut down by terminating the backup power.

The computer is operated with a nonvolatile storage medium, such as a disk formed of magnetic media for recording the digital signal produced by the computer. Such a disk is employed, generally, for the storage of an operating system program which provides the basic instructions to the computer for operation of the CPU and for interfacing with a display and a keyboard. The disk also stores an application program for directing the operation of the computer to accomplish a specific task such as word processing. The disk also stores data produced by the computer such as a report which has been typed with the aid of the word-processing program. The disk is housed in a disk drive connected by a bus, or other suitable high-speed data-communication link to the CPU. In order to facilitate a rapid transfer of the data at the onset of the power outage, and the program stage at the onset of the power outage, to the nonvolatile storage medium, it is a feature of the invention to employ the foregoing disk as the nonvolatile storage medium. This is advantageous in allowing increased speed of data transfer over the foregoing bus, and eliminates the need for additional storage equipment. Storage of the data and the program stage is accomplished by designating a part of the disk to be used for the backup storage during the power outage. The designation of the backup part of the disk is done upon boot-up of the computer prior to use of the application program.

The procedure of the invention is accomplished by use of an additional program, which may be viewed as an addendum to the system program. The additional program is stored in a RAM which could be volatile or nonvolatile which forms a part of circuitry of the invention, the circuitry being disposed readily upon a card suitable for mounting within the computer. The circuitry is connected directly to the CPU so as to implement the power-down program upon an occurrence of the power interruption. The card which supports the circuitry of the invention may be referred to as a backup power card. Also included within the circuitry are sources of backup power at the various voltages required by the computer, a sensor of the voltages provided by the primary power supplies of the computer, and a controller for activating the backup power sources of the power card and for dispensing the power-down program to the CPU. Upon the sensing of a reduction of one or more of the supply voltages, the power card circuitry implements the foregoing power-down procedure, and stores a signal on the disk indicating that a power outage has occurred. Also, an instruction is recorded on the disk to direct the computer to read the power-down signal during the next boot-up of the computer. Upon request of the operator, the computer is available to resume the original routine interrupted by the power outage or to perform some other task. Since all necessary information for resumption of the disrupted program has been stored in the disk, the disrupted program can be resumed at any time of convenience to the operator.

BRIEF DESCRIPTION OF THE DRAWING

The foregoing aspects and other features of the invention are explained in the following description, taken in connection with the accompanying drawing wherein.

DETAILED DESCRIPTION

Figure 1:
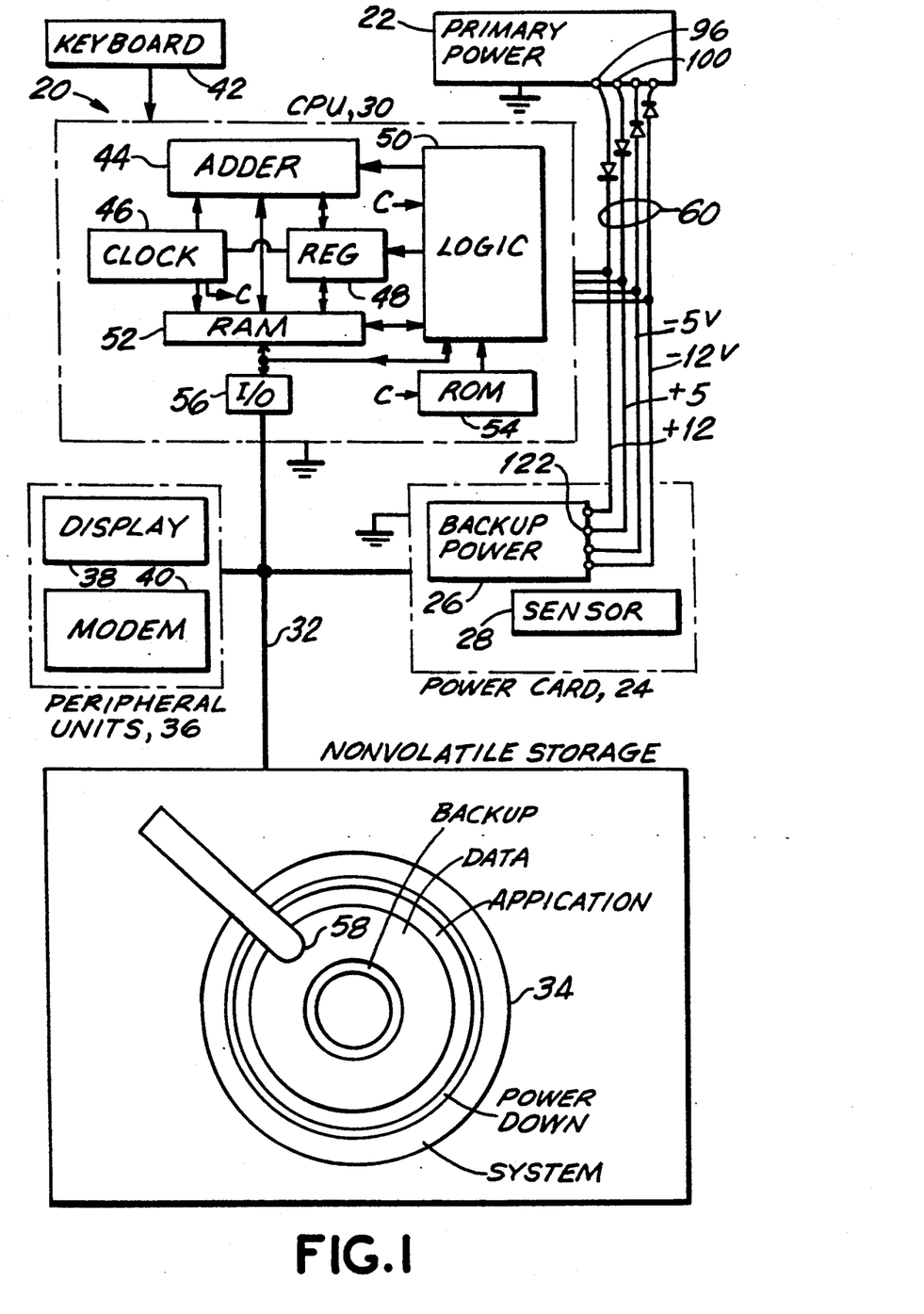
FIG. 1 is a block diagram of a computer operative with a power card of the invention.

FIG. 1 shows a computer 20 receiving electric power from a primary source of power 22, and which is protected against an interruption of electric power from the primary source 22, in accordance with the invention, by a power card 24. The power card 24 includes a source 26 of back-up power, a sensor 28 of electric voltages provided by the primary source 22, and other circuitry as will be described hereinafter in further detail. The computer 20 includes a central processing unit (CPU) 30 connected via a data bus 32 to a nonvolatile storage such as a magnetic disk 34, and two peripheral units 36 which may include, by way of example, a display 38, and a modem 40. The computer 20 includes a keyboard 4 connected to the CPU 30 for entry of data and command signals.

By way of example in the use of the invention, the CPU 30 is portrayed as having the components normally found in a central processing unit. The CPU 30 includes an adder 44, a clock 46, a register 48, a logic unit 50, a random-access memory (RAM) 52, a read-only memory (ROM) 54, and an input-output unit 56. In the operation of the computer 20, the adder 44 operates under control of the logic unit 50 to add numerals together which are stored temporarily in the register 48, the partial sums stored in the register 48 being useful in addition routines and in routines for performing multiplies, as is well known. By way of further example, the register 48 can be employed as a counter of procedural stages in the running of an application program, such as a program for inverting a matrix, a program for rotating a view of an object portrayed on a screen of the display 38, or for setting up a print file to print out a document generated by a word processing program. Data generated by the application program as well as program instructions may be stored in the RAM 52. Basic system instructions for carrying out logic routines for operation of the computer are stored in the ROM 54, the ROM outputting these instructions to the logic unit 50. The various components of the CPU 30 operate in response to clock pulses (C) provided by the clock 46. The input-output unit 56 applies signals outputted by the RAM 52 to the bus 32 for communication with other units connected to the bus 32, such as the peripheral units 36, and the magnetic storage disk 34. Communication via a data bus is well known, and is understood to include any one of well known protocols wherein blocks of data are transmitted in data frames which include an identification word identifying the data and one or more flags indicating the beginning and end of a data frame as well as a direction of travel along the bus 32.

The storage disk 34 is of well-known configuration, and rotates past a read-write head 58 which moves to the requisite track for reading data previously stored in the magnetic medium of the disk 34, and for writing new data onto the magnetic medium of the disk 34. In accordance with a feature of the invention, the stored data on the disk 34 includes instructions relating to the use of the power card 24. Thus, by way of example, in the distribution of data on the disk 34, a band or region of tracks store the operating system which provides instruction to the CPU 30 to provide basic procedural functions, such as the manner of displaying data on the display 38, and the manner of interfacing with the keyboard 42, as is well known. The next band or region of stored data relates to the power-down procedure implemented by the power card, and may be regarded as an addendum to the operating system. More specifically, during a boot-up of the computer 20, the computer reads data from both the operating system and from the power-down procedure as stored on the disk 34.

The power-down region of the disk informs the computer 20 and an operator of the computer as to whether a power interruption has occurred previously so that the operator has the option of resuming a previously interrupted program, or of selecting other work to be performed on the computer 20. The power-down region also informs the computer 20 as to the identity of the power card 24 so as to enable communication via the bus 32 with the power card 24. The next two regions, by way of example, are the region of the application program and the region wherein data generated by various application programs are stored. Finally, in accordance with a further feature of the invention, there is a region of the disk 34 which has been designated by the power card 24 to be used for storage of the backup data which allows resumption of an application program previously terminated upon the occurrence of an interruption of the power of the primary power source 22. As will be explained hereinafter, the backup region stores all necessary information for resumption of the terminated program including such instructions of the program which has been transferred from the disk 34 to the RAM 52 and a count of the stages of a procedure being carried out by the application program, which count had been stored in the register 48 at the time of the power interruption. These aspects of the invention and a description of circuitry from the power card 24 will be explained now in further detail in the ensuing description.

Figure 2:
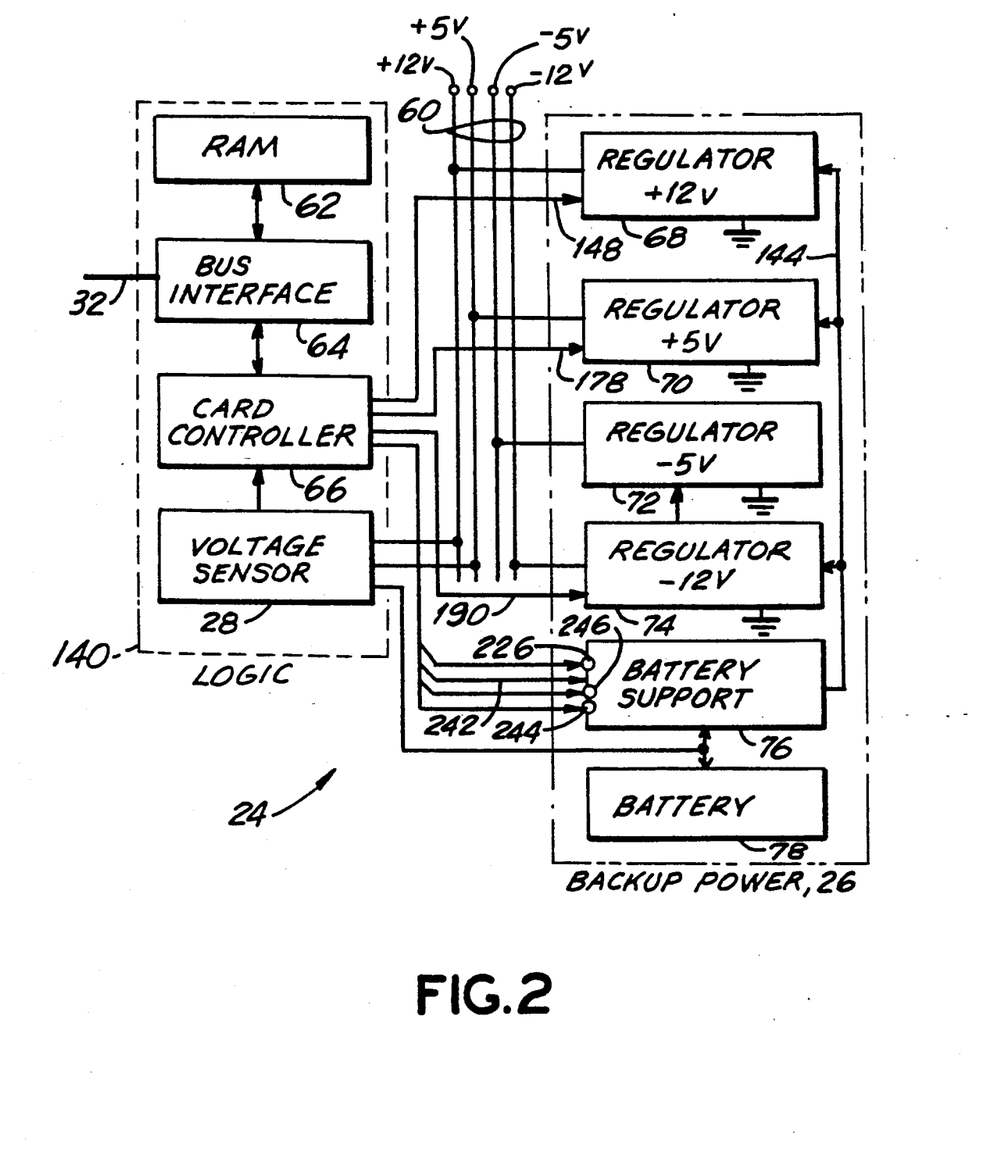
FIG. 2 is a block diagram of the power card of the invention.

With reference to FIGS. 1 and 2, the primary power source 22 and the power card 24 are interconnected by a cable 60 which provides electric power to the CPU 30. By way of example, the cable 60 comprises lines supplying +5 volts and +12 volts, and −5 volts and −12 volts. It is to be understood that these voltages are indicated because present computer circuitry, such as that employed in personal computers manufactured by a number of manufacturers employ circuits operative with these voltages. However, the backup power and power sensing functions of the invention can be practiced also with computer circuits operating at other voltages. Thereby, in the event of failure of the primary power source 22, the cable 60 can provide power from the backup power source 26 to the CPU 30.

As shown in FIG. 2, the circuitry of the power card 24 comprises a random-access memory (RAM) 62, an interface 64 for connection with the data bus 32 (shown also in FIG. 1), a controller 66 for the components of the card 24, and the aforementioned voltage sensor 28 and the backup power source 26. The backup power source 26 comprises a regulator 68 which supplies +12 volts, a regulator 70 which supplies +5 volts, a regulator 72 which supplies −5 volts, a regulator 74 which supplies −12 volts, and a battery support unit 76 which interconnects a battery 78 with the regulators 68, 70, 72, and 74. As will be described below, the circuitry of the voltage sensor 28 includes sensors 80 and 82 (FIG. 3) of the +12 volts and the +5 volts, respectively, and a sensor 84 (FIG. 3) of voltage of the battery 78. Separate circuits are provided for the regulators 68 and 70 as will be disclosed, respectively, with reference to FIGS. 4 and 5. The regulators 72 and 74 are shown in the single circuit of FIG. 6. The battery support unit 76 will be described in the circuitry of FIG. 7.

Figure 3A:
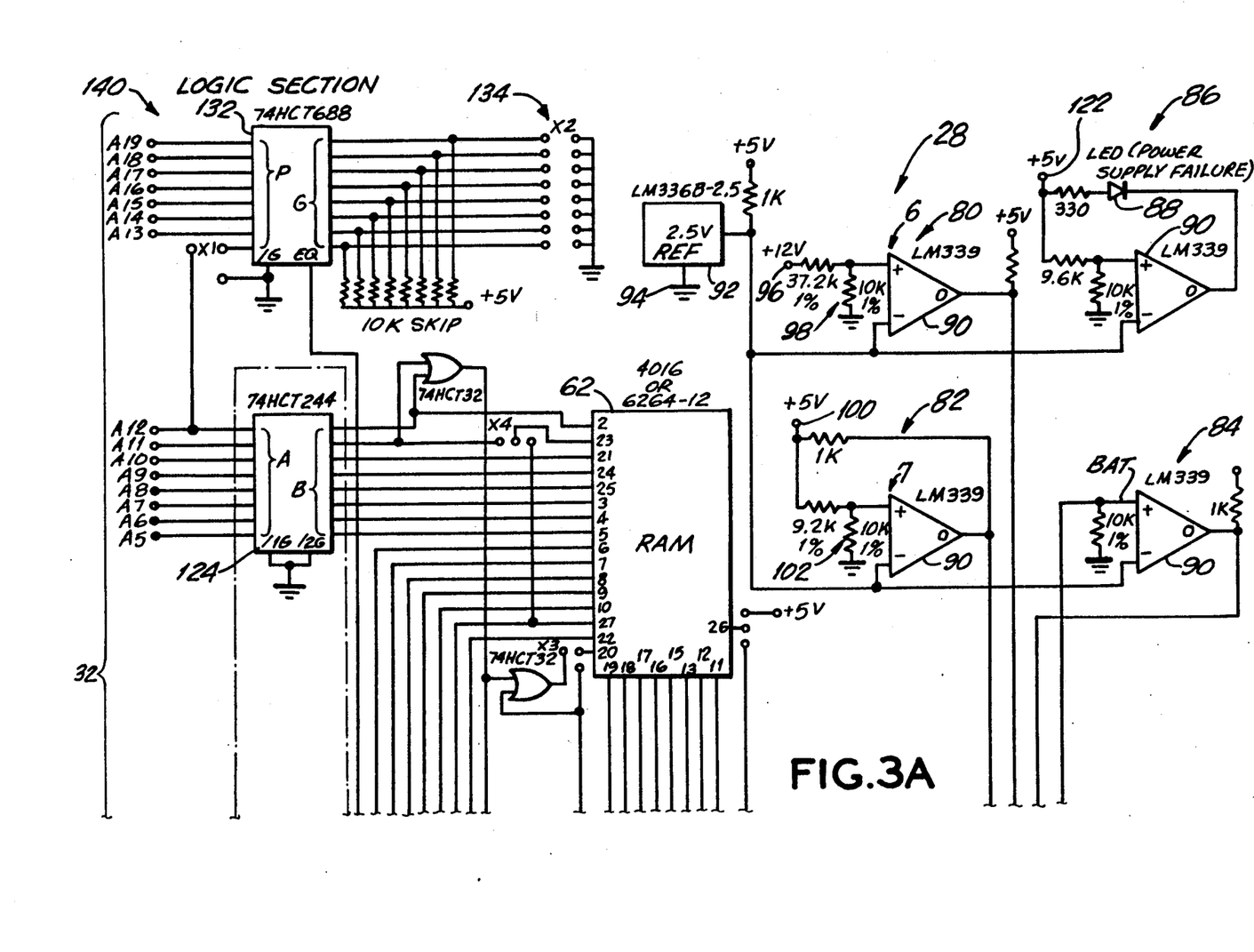
FIG. 3 is a block diagram of a logic section of the power card.
Figure 3B:
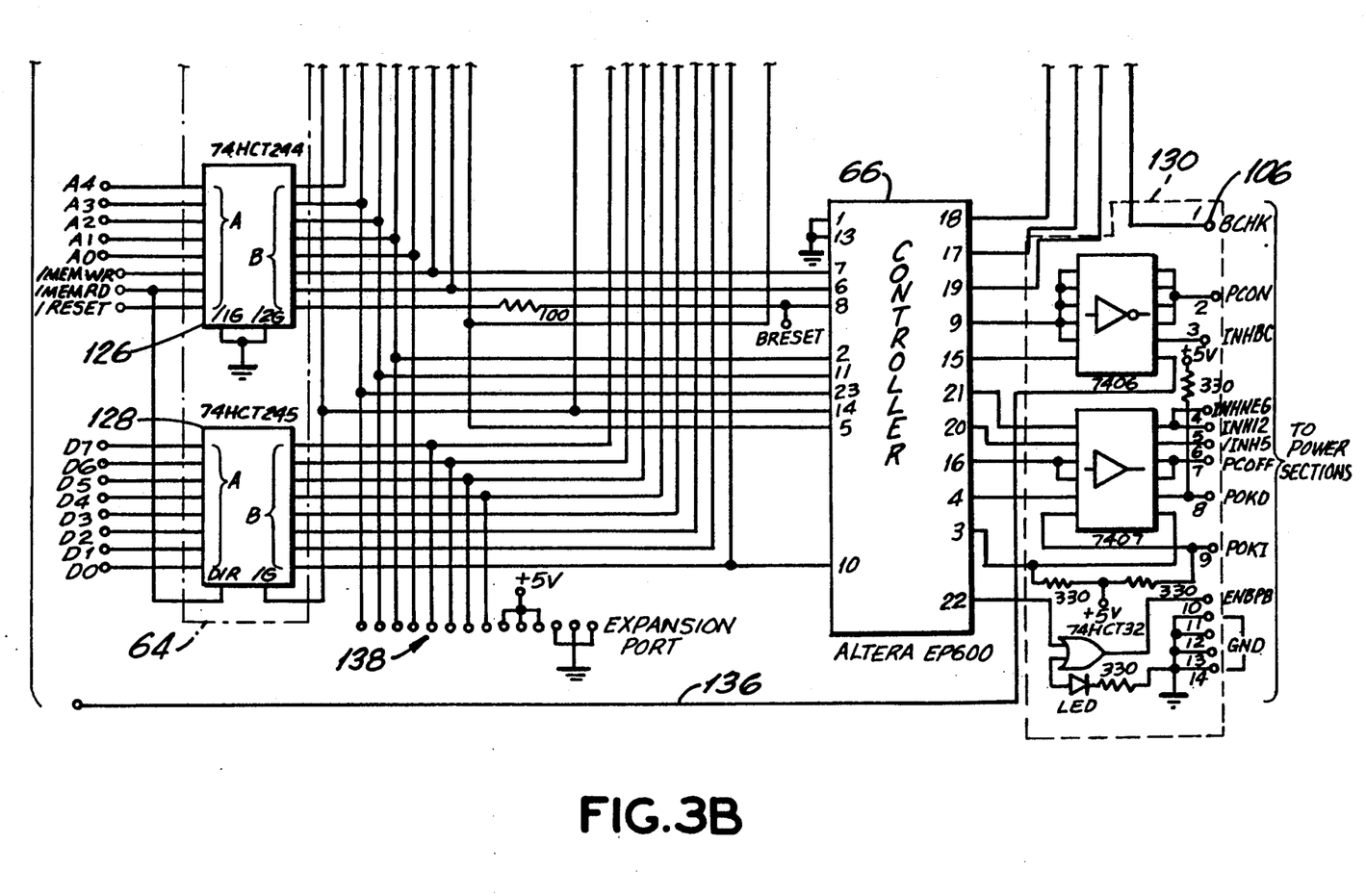

FIG. 3 shows circuitry of the power card 24, the circuitry including the RAM 62, the bus interface 64, the card controller 66, and the aforementioned sensors 80, 82 and 84 in the circuitry of the voltage sensor 28. Also included is a further sensor 86 responsive to the presence of a 5 volt signal for activating a light-emitting diode (LED) 88 to indicate a failure of the primary power supply 22 (FIG. 1).

Each of the sensors 80, 82, 84, and 86 is constructed as a comparator circuit, and includes a comparator 90. The negative input terminal of each of the comparators 90 is coupled to a source 92 of reference voltage, the reference voltage being established relative to ground 94. In the sensor 80, the positive input terminal of the comparator 90 is coupled to a +12-volt terminal 96 (FIGS. 1 and 3) of the primary power supply 22, the terminal 96 being connected to the comparator 90 by a resistive voltage divider 98.

In the sensor 82, the positive input terminal of the comparator 90 is connected to a +5-volt terminal 100 (FIGS. 1 and 3) of the primary power supply 22, the terminal 100 being connected to the comparator 90 by a resistive voltage divider 102. Operation of the primary source 22 may be monitored by sensing output voltage at one or more of the output terminals as may be desired, the two terminals 96 and 100 having been selected, by way of example, in the construction of a preferred embodiment of the invention.

Figure 7:
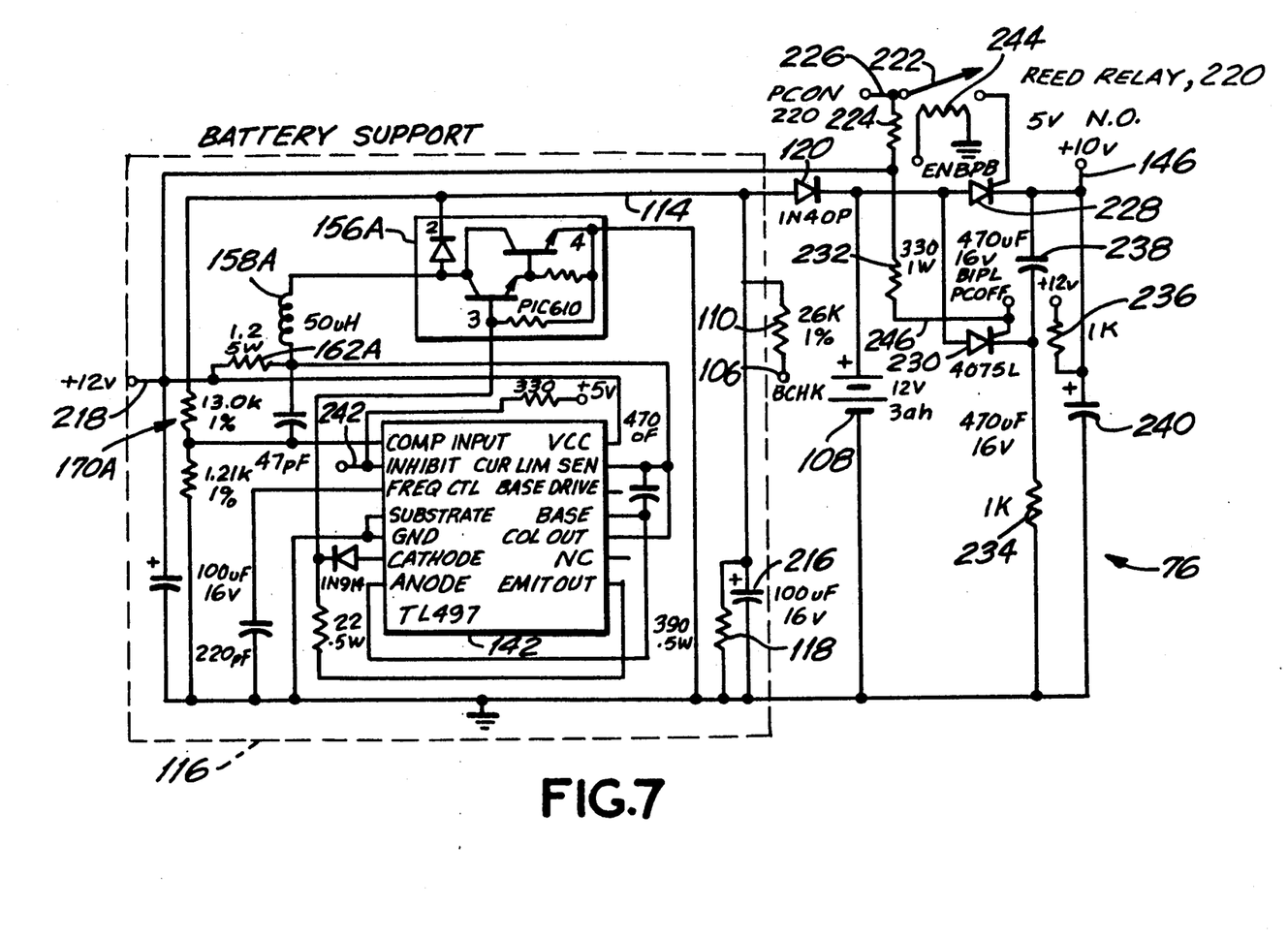
FIG. 7 is a schematic diagram showing a battery support unit of the power card.

In the sensor 84, the positive input terminal of the comparator 90 is connected via terminal 106 (FIGS. 3 and 7) to monitor voltage of the battery 108 (FIG. 7), the terminal 106 being a junction between a resistor 110 (FIG. 7) and a resistor 112 which form a voltage divider coupling the comparator 90 to an output line 114 of a battery charger 116 (FIG. 7). By way of example, the battery 108 is presumed to be a 12-volt battery, and the sensor 84 signals a battery failure when battery voltage drops below 9 volts. The voltage divider of resistors 110 and 112 is connected in parallel with a resistor 118 (FIG. 7) and is connected via a diode 120 (FIG. 7) to the positive terminal of the battery 108.

In FIG. 3, the interface 64 comprises a set of three buffers 124, 126, and 128 which interconnect lines of the bus 32 to the RAM 62 and to the controller 66. Output terminals of the comparators 90 of the sensors 80, 82, and 84 are connected to input ports of the controller 66. The circuitry of FIG. 2 also includes buffer circuitry 130 which interconnects output ports of the controller 66 with input terminals of the backup power regulators of FIGS. 4, 5 and 6.

With respect to the operation of the power card 24, particularly the circuitry thereof shown in FIG. 3, the RAM 62, the bus interface 64, and the controller 66 are operative with the bus 32 for communication of data and control signals with the CPU 30 (FIG. 1) in the case where the computer 20 is a personal computer which, by way of example, may be a personal computer manufactured by the INTERNATIONAL BUSINESS MACHINE CORPORATION and compatible computers. If desired, the power card 24 can be fabricated as a stand-alone card for control of power sections in a computer via a flat cable, thereby allowing for separate controller and power units. The construction of the invention of the power card 24 is in modular design, this allowing the implementation of logic controllers for compatibility with types of computer systems, other than the foregoing personal computer (P.C.), while using the same power circuitry in the power card. The disclosed embodiment is a single, full sized, P.C. bus compatible card that contains all sections of the back-up circuitry except for the storage battery which would be mounted at a location of convenience from the point of view of manufacture and utilization of the computer. It should be appreciated, however, that the circuitry could be built directly onto the mother board rather than on a separate card.

The control program to accomplish a saving of data and a resumption of computer operation with the saved data is stored in the RAM 62. The RAM 62 is auxiliary memory space separate from that normally employed in the operation of the computer 20. The RAM containing the backup routine is not part of the "standard", "expanded", or "extended" memory so as not to interfere with any system resources. The power card 24 activates the backup power supplies and the battery charger and provides for the deactivation according to instructions from the host computer. By means of the bus 32 and the interface 64, the controller 66 can inform the host computer of proper and faulty operating conditions of the power supplies, and also will automatically activate the backup power source 26 when the backup power is needed. The controller 66 is readily fabricated as a circuit chip on the card 24.

With respect to addressing the RAM 62 and the controller 66, the addresses occupy a window of 8 kilobytes and a lower range of megabyte of standard memory address space, as may be established with the aid of a buffer 132 and address jumpers 134. In the usual installation of the card 24 in a computer, such as the computer 20, the card would be addressed in auxiliary memory space. By way of example, the starting address for the card 24 would be the address CE000H. As noted above, the RAM 62 has sufficient storage space for storing a program for control of the power card 24, including the saving of data and restoration of the application program at the stage of operation which was present at the time of the power interruption. The preferred embodiment of the invention is advantageous in that no standard memory space is assumed by the program of the power card 24, and that only backup operating resources are used. This results in an independence of the backup operating system from the operating system of the host computer. By use of the bus 32, the power card 24 provides power status signals to the computer 20. The interface 62 and the buffer circuitry 130 can be employed with various computers and backup power circuits so that the invention is operative to support, for example, the use of a specific power circuit for different computer systems, simply by changing instructions stored in the RAM 62. The system can be arranged wherein the residual portion backup routine does not use operating system resources, only BIOS.

By way of example in further versatility of the invention of the power card 24, the card circuitry can support a power section integrated into a main power supply, rather than a stand-alone backup power section. The controller 66 serves as a programmable service that can have several functions performed under program control. The power backup system can be enabled or disabled. The power regulator circuitry of FIGS. 1, 5, and 6 can be controlled individually. A signal indicating failure of the primary power source 22, and the status of each of the sensors 80, 82 and 94, as well as the current state of the controller 66 can be transmitted to the host computer. A failure signal indicating the failure of the primary power source 22 is transmitted via line 136 from the buffer circuitry 130 to the bus. An expansion connector 138 is provided to allow for connection of additional circuit components for additional functions to the power card 24, should such functions be desired.

Also, from the point of view of modular construction of the power card 24, it is convenient to construct the circuitry of the RAM 62, the interface 64, the controller 66, and the sensor 38 as a logic control section 140 (FIGS. 2 and 3) as distinguished from the regulators and the battery support unit of the back-up power source 26. With respect to this modular construction, it is noted that the voltage divider comprising the resistors 110 and 112 which interconnect the sensor 84 (FIG. 3) with the battery support unit 76 (FIG. 7) has the resistor 110 located in the battery support unit 72 and the resistor 112 located in the logic section 140 so that the logic section 140 can be considered as a stand-alone component of the design of the power card 24. This allows other batteries of different voltages to be used in the practice of the invention. The values of the resistors 110 and 112 would be selected based on the voltage of any selected battery to provide for the desired level of trigger voltage at the sensor 84, typically a value of 2.5 volts to indicate a low battery condition.

Figure 4:
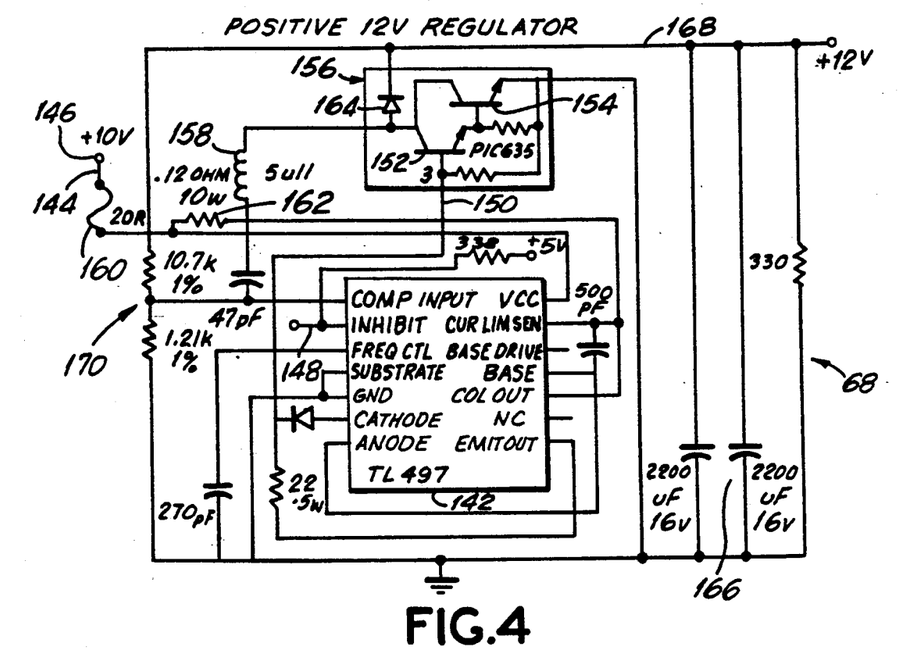
FIG. 4 is a schematic diagram of a +12 volt regulator of the power card.

FIG. 4 shows circuitry of the regulator 68. The circuitry is of the form known as the boost-type switching regulator which produces a +12 volts from a 10 volt DC source, such as a battery. Included within the circuitry is a switching regulator 142 which receives input voltage on line 144 (also shown on FIG. 2) from terminal 146 of the battery support unit 76 (FIG. 7). The switching regulator 142 is provided with an inhibit terminal which connects via line 148 to the controller 66 (FIG. 2) to allow the controller 66 to activate and deactivate the regulator 68 independently of the other regulators 70, 72, and 74 shown in FIG. 2. Since the general form of the circuitry of the regulator 68 is well known, only a brief description of the circuitry is provided.

The switching regulator 142 includes an oscillator (not shown) which outputs current pulses via line 150 to the base of a transistor 152 which drives a second transistor 154. The two transistors 152 and 154 constitute a gate 156 which allows the passage of current through an inductor 158. Current for the inductor 158 is provided via line 144 through a fuse 160 and a resistor 162. Upon termination of inductor current through the transistors of the gate 156, the inductor current continues to flow from the inductor 158 via a diode 164 into a capacitor bank 166. The pulses of current applied to the capacitor bank 166 charge the capacitors to the desired +12 volts which appears between an output terminal at line 168 and ground. A resistive voltage divider 170 provides a measure of the output voltage to an input terminal of the switching regulator 142 to control the average value of the inductor current so as to maintain the voltage across the capacitor bank 166 at the desired output voltage of +12 volts.

Figure 5:
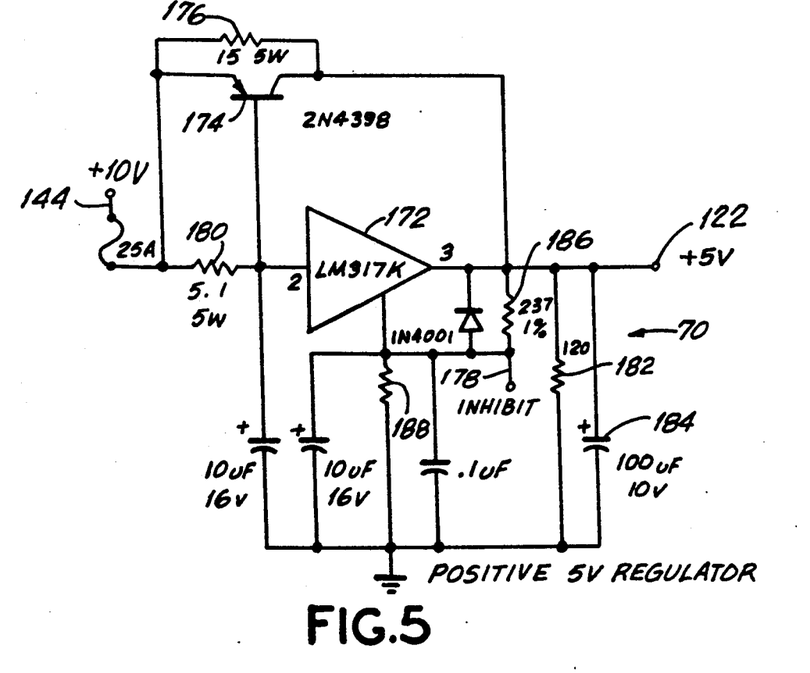
FIG. 5 is a schematic diagram of a +5 volt regulator of the power card.

FIG. 5 shows circuitry of the regulator 70. The circuitry employs a well-known linear regulator 172 with a pass transistor 174 and a pass resistor 176 to boost current handling capacity of the circuitry. An inhibit signal is applied via line 178 from the controller 66

(FIG. 2) to allow activation and deactivation of the regulator 70 independently of the other regulators 68, 72, and 74 of FIG. 2. The operation of a linear regulator circuit, such as that of FIG. 5, is well known and, accordingly, need be described only briefly. Input power is coupled via line 144 (FIG. 2) from the battery support unit 76 to the regulator 70. Current from line 144 is coupled via a resistor 180 to the base terminal of the transistor 174 to place the transistor 174 in a state of conduction. Current flowing through the transistor 174 and the resistor 176 flows to a load (not shown) coupled between output terminal 122 and ground, the portion of the current also flowing through resistor 182 to establish a voltage drop across the resistor 182 equal to the desired +5 volts. The current also charges the capacitor 184 to the desired output voltage at terminal 122, the capacitor and the resistor 182 being connected in parallel between the output terminal 122 and ground. The circuitry of the regulator 70 also includes resistors 186 and 188 which are connected in series between terminal 122 and ground to provide a voltage divider which presents a measure of the output voltage to the linear regulator 172. The linear regulator 172 is connected between the base terminal of the transistor 174 and the output terminal 122. Variation in the measured voltage produced by the voltage divider of resistors 186 and 188 operates the linear regulator 172 to increase or to decrease current flow through the regulator 172 so as to maintain the desired value of output voltage of the regulator 70.

Figure 6:
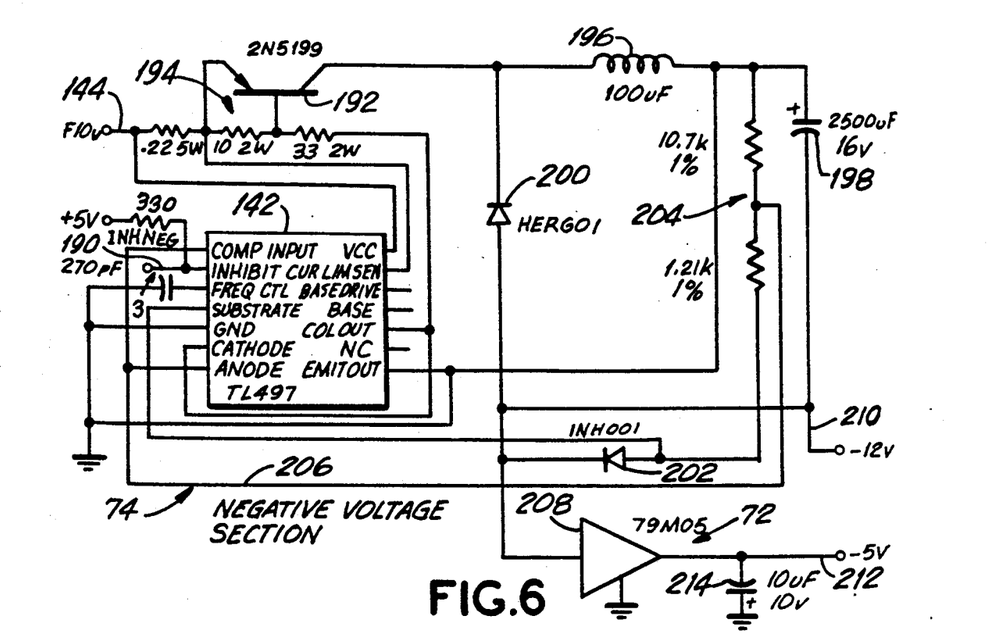
FIG. 6 is a schematic diagram showing both a −12 volt regulator and −5 volt regulator of the power card.

The circuitry of FIG. 6 includes two regulators, namely, the regulator 72 and the regulator 74. The regulator 74 employs input power on line 144 from the battery support unit 76 (FIG. 2) to produce the desired output voltage of −12 volts, the −12 volts being coupled to the regulator 72 to produce a desired output of −5 volts. The regulator 74 includes the switching regulator 142 previously described in FIG. 4. Input power to the switching regulator 142 is applied via line 144. The inhibit signal to the switching regulator 142 is provided via line 190 to the controller 66 (FIG. 2). In view of the interconnection of the regulator 72 with the regulator 74, a signal on line 190 serves to activate or deactivate both of the regulators 72 and 74.

The configuration of the circuitry of FIG. 6 differs from that of FIG. 4 in that the circuitry of FIG. 6 converts the positive battery voltage to a negative voltage while the circuitry of FIG. 4 converts the positive battery voltage to a positive voltage. In FIG. 6, the transistor 192 has its emitter and base terminals connected via a resistive voltage divider 194 between the voltage on line 144 and the voltage at an output terminal of the switching regulator 142. Operation of the switching regulator 142 gates the transistor 192 to provide pulses of current to an inductor 196. Opposite terminals of the inductor 196 are connected together via a series circuit comprising a capacitor 198 and a diode 200. A junction of the capacitor 198 with the diode 200 is connected via a diode 202 with a terminal of the switching regulator 142.

In operation, activation of the transistor 192 by the switching regulator 142 produces a pulse of current in the inductor 196, the inductor current flowing from the collector terminals of the transistor 192 through the inductor 196 to ground to complete the circuit with the battery support unit 76. Upon termination of the current by termination of base current to the transistor 192, the inductor current continues to flow via the diode 200 into the capacitor 198, thereby to charge the capacitor 198 to the desired output voltage of −12 volts. A further resistive voltage divider 204 is connected in series with the diode 202 across the terminals of the capacitor 198 to provide a measure on line 206 of the output voltage across a capacitor 198. The measure of the output voltage on line 206 is applied as a feedback signal to the switching regulator 142 to enable the switching regulator 142 to adjust the average value of the pulse inductor current in the conductor 196 to maintain the desired output voltage across the capacitor 198. The diode 202 serves to deactivate the regulator 72 upon a deactivation of the regulator 74 by operation of the inhibit signal on line 190. The regulator 72 employs a well-known linear regulator 208 which operates in a manner similar to that of the linear regulator 172 (FIG. 5), and is connected between the −12 volts output terminals 210 and ground to raise the voltage at the output terminals 210 by +7 volts to provide an output voltage of −5 volts at an output terminal 212 of the regulator 72. The junction of the capacitor 198 and the inductor 196 is connected to ground to provide the ground reference for the voltages appearing at the output terminals 210 and 212. Also included within the regulator 72 is a capacitor 214 connected to the output terminal of the regulator 208 for filtering the voltage and the current outputted by the regulator 208.

FIG. 7 shows circuitry of the battery support unit 76. The charger 116 of the battery support unit 76 comprises the switching regulator 142 previously described with reference to FIG. 4. The charger 116 of the battery support unit 76 also includes a gate 156A, an inductor 158A, a resistor 162A, and a voltage divider 170A which are connected in circuit with the switching regulator 142 and operate in the manner previously described with respect to the gate 156, the inductor 158, the resistor 162, and the voltage divider 170 of FIG. 4. The charger 116 includes also a capacitor 216 (FIG. 7) which is charged by current from the inductor 158A in the same manner as the capacitor bank 166 is charged by current pulses from the inductor 158. An input voltage of +12 volts is applied to the resistor 162A and to the switching regulator 142 via terminal 218 from the main power supply of the host computer 20.

In the operation of the battery support unit 76, the charger 116 applies the output voltage appearing across the capacitor 216 via the diode 120, previously described above, to the battery 108. As shown in FIG. 7, the battery support unit 76 further comprises a reed relay to 220 having a contact 222 connected via a resistor 224 to the +12 volt terminal 218. A junction of the contact 222 with the resistor 224 at terminal 226 receives a signal identified as the PCON signal. The support unit 76 further comprises two SCRs (silicon-control rectifiers) 228 and 230, resistors 232, 234, and 236, and capacitors 238 and 240. An inhibit signal applied via line 242 permits the controller 66 (FIG. 2) to activate and deactivate the battery support unit 76 independently of the regulators of the back-up power source 26.

In FIG. 7, the charger 116 provides a constant voltage, current limited, charging of the storage battery 108 by use of power provided by a +12 volt section of the host computers primary power source 22 (FIG. 1). The inhibit signal on line 242 is employed to enable the charger 116, normally, whenever the computer 20 is operating. However, in the event of a power outage of the primary power source 22, the power card 24 is active to provide battery power for operating the computer 20 and, concurrently with the activation of the power card 24, the charger 116 is disabled by the inhibit signal on line 242. The diode 120 serves to conduct current from the charger 116 during a charging of the battery 108, and to prevent the circuitry of the charger 116 from draining the battery 108 when the computer 20 is inactive.

The SCR 228 serves to electrically connect the battery 108 to the regulators 68, 70, 72, and 74 (FIG. 2) upon the presence of the PCON signal at its terminal 226, the PCON signal being provided by the controller 66 (FIG. 2). The controller 66 also energizes a coil 244 of the relay 220 to activate the relay 220 and to close the contact 222 for coupling the PCON signal to a gate terminal of the SCR 228. Application of the PCON signal to the gate terminal of the SCR 228 places the gate 228 in a state of electrical conduction. The relay 220 serves to prevent the SCR 228 from any re-triggering due to a possible presence of voltage or current spikes upon a deactivation of the power card 24.

The SCR 230 is employed to disconnect electrically the battery 108 from the regulator 68, 70, 72, and 74 upon application of a PCOFF signal by the controller 66 to the gate terminal 246 of the SCR 230. Deactivation of the relay 220 operates to deactivate the power card 24 due to disconnection of the PCON signal from the gate terminal of the SCR 228. After deactivation of the relay 220, the PCOFF is transmitted by the controller 66 to the gate terminal 246 of the SCR 230. In response to the presence of the PCOFF signal, the SCR 230 conducts to apply current from the battery 108 to the regulators 68, 70, 72, and 74 momentarily via the capacitor 238. This results in the SCR 228 being placed in a state of nonconduction. Subsequently, after a discharge of the capacitor 238 via the resistor 234, the SCR 230 becomes nonconducting, and the battery 108 is no longer connected electrically to the regulator 68, 70, 72, and 74. Accordingly, the power card 24 is deactivated. The capacitor 240 is connected between the output terminal 146 of the support unit 75 and ground to act as a filter of the output voltage and current of the support unit 76. The resistor 224 serves as a pull-up resistor for the PCON signal at terminal 226. The resistor 236 serves as a bleed resistor to maintain the capacitor 240 in a state of charge which reduces the amplitude of a voltage spike which may possibly be present at the output terminal 146 upon activation of the regulators 68, 70, 72, and 72. The resistor 232 is connected between the +12 volt terminal 218 and the gate terminal 246 to serve as a pull-up resistor for the PCOFF signal.

Figure 8:
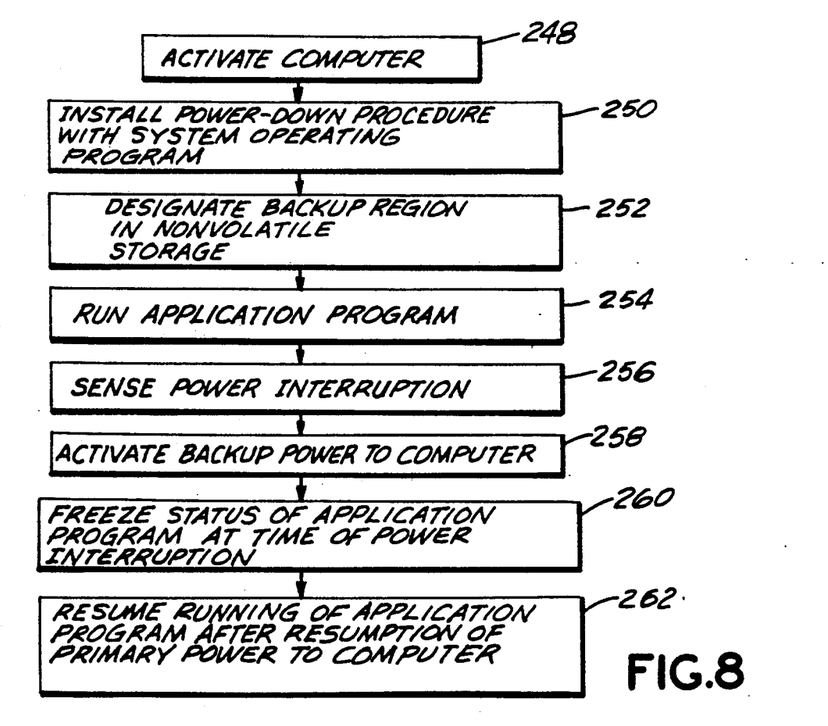
FIGS. 8-10 are flow charts explaining an operational procedure of the invention.
Figure 9:
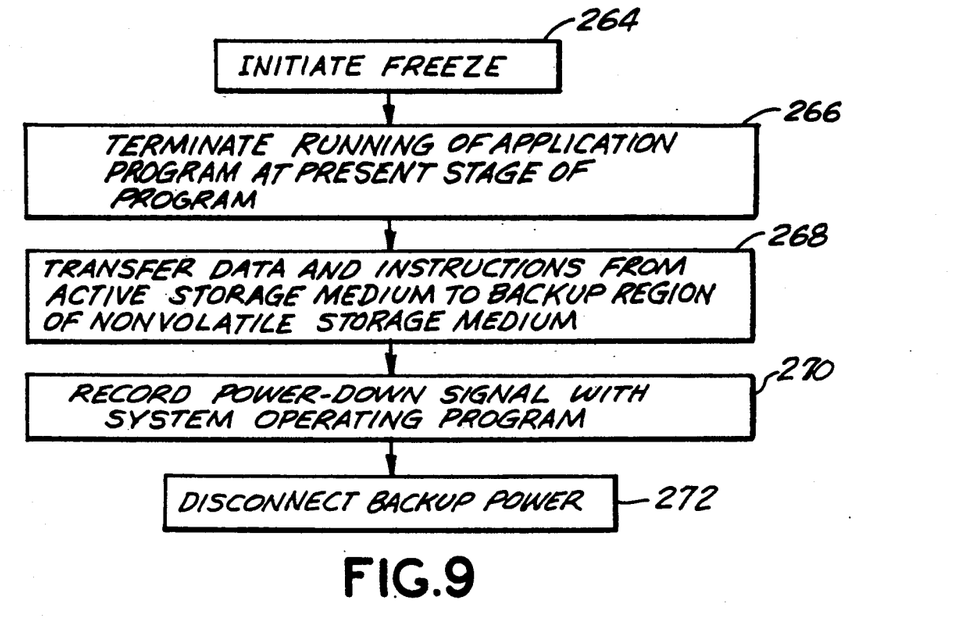
Figure 10:
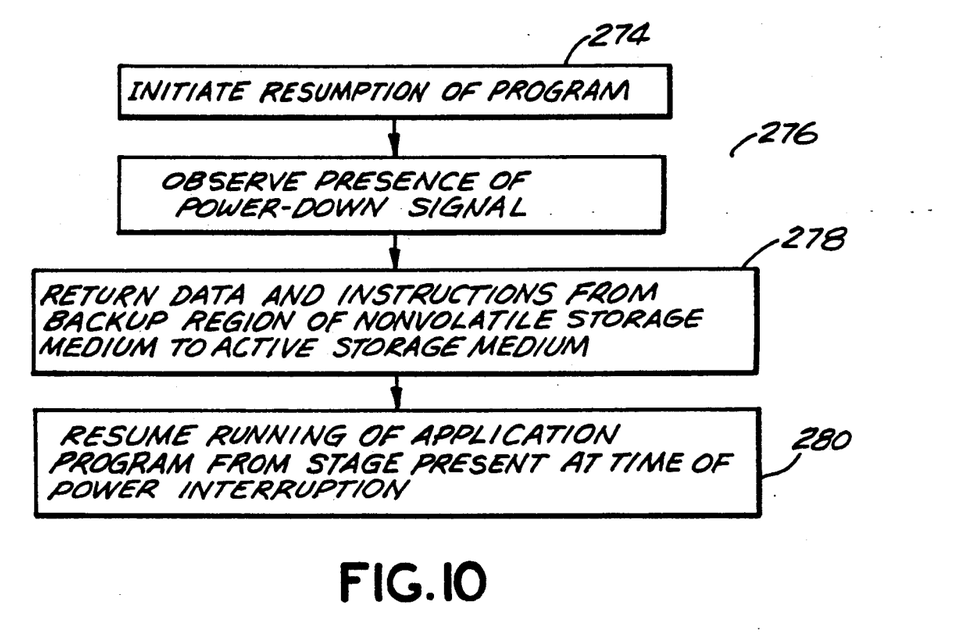

The operation of the invention is explained further with respect to the flow charts of FIGS. 8, 9, and 10. In FIG. 8, the procedure for use of the computer 20 (FIG. 1) begins with an activating of the computer at block 248, this step including the application of power from the primary power source 22 and the initiation of operation in accordance with the operating system stored in the magnetic storage disk 34, this procedure being referred to frequently as booting-up the computer. The procedure continues at block 250 with the installing of at least a portion of the power-down procedure within the system operating program. The complete power-down procedure is stored in the RAM 62 of the logic section 140 of the power card 24 (FIGS. 2 and 3). However, at least a portion of the procedure, such as instructions directing the computer to recognize the presence of the RAM 62 and to follow commands stored therein are stored in the disk 34 along with the operating system or, if desired, may be stored alternatively in the RAM 52 of the CPU 30 during each booting-up of the computer 20. By storing these instructions in the storage disk 34, the computer 20 is enabled automatically to cooperate with the power card 24 without intervention on the part of a person operating the computer.

At block 252, the procedure continues with a designating of the back-up region of the nonvolatile storage medium, the disk 34, for receipt of data and instructions of the application program upon the occurrence of an interruption of the primary power source 22. It is advantageous to select a portion of the disk 34 which is not being used for the storage of data. Otherwise, data which has been previously written in that portion of the disk 34 will be written over by the data and instructions transferred to the disk 34 during a power outage. It is also possible that the non-volatile storage area will be in another computer connected via a known type of network link or communications link.

Thereafter, at block 254, an application program is run in its usual fashion, and a person operating the computer may insert data, extract data, and direct various computations and other procedures of the computer 20 in accordance with the usual fashion of operating the application program. However, during all times of operating the application program, there is the procedural step at block 256 of sensing the outputting of electric power by the primary power source 22 to the computer 20. Thus, at block 256, any interruption in the primary power is sensed as described previously with reference to the circuitry of the voltage sensor 28 described with reference to FIG. 3.

Upon the sensing of a power interruption, the procedure advances to block 258 in which the backup power source 26 (FIG. 2) is activated by the controller 66 as has been described with reference to the circuit of FIGS. 3–7. Then, the present status of the application program including all data and data which may be only partially formed, such as terms of a mathematical expression which are being developed, are frozen as of the status at the time of the power interruption, as indicated at block 260 until a later time of convenience, after resumption of the primary power, in which an operator of the computer elects to resume the running of the application program from its status at the time of the power interruption, as indicated at block 262.

FIG. 9 shows details in the freezing of the status of the application program. The freezing is initiated at block 264 and then continues at block 266 with a termination of the running of the application program at the present stage in the running, the present stage being the instant of power interruption. To preserve the status of any instructions and subroutines which have been called forth from the nonvolatile storage disk 34 to the RAM 52, and possibly to the register 48, of the CPU 30, and to save the present status of all data, particularly partial sums and products of mathematical routines which may be stored in either or both the RAM 52 and the register 48, a clocking of the steps in the procedure in the running of the application program is arrested by commands from the RAM 62 of the power card 24 (FIG. 3) in cooperation with instructions from the controller 66 of the power card 24. This is being accomplished while the computer 20 is operating under the backup power.

In order to preserve the present state of the data and instructions, at block 268, the data and the instructions are transferred from the active storage medium of the RAM 52 and the register 48 to the backup region of the nonvolatile storage medium of the disk 34. This freezes the present status of the application program existing at the time of the interruption, the freezing retaining the status of the data and the instructions even after a subsequent deactivation or disconnection of the backup power source 26 from the CPU 30. Prior to disconnection of the backup power, at block 270, a signal is recorded in the nonvolatile storage disk 34 indicating that an interruption has occurred, the signal being placed with the operating system program so as to be observed during a subsequent boot-up of the computer resumption of primary power. The signal indicates to an operator of the computer that an interruption has occurred and that the interrupted application program can be resumed at a time convenient to the operator. The final step of the freezing procedure, indicated at block 272, is the disconnection or deactivation of the backup power as has been described with reference to the circuitry of FIG. 7.

An important aspect of the invention is that the transfer of the data and instructions at block 268 is accomplished by use of the data bus 32, this being the same bus which is utilized by the computer 20 during normal operation in which data and instructions are transferred between the volatile and the nonvolatile storage media. As is well known, such data transfer is accomplished rapidly, normally within a small fraction of a second. In the same way, the transfer of data and instructions during the freezing procedure also is accomplished, normally, within a small fraction of a second. This greatly relieves the burden on the backup power source 26 of providing adequate energy for running the computer during an outage of the primary power. As a result of this feature of the invention, a relatively small energy storage, as provided by the battery 108 (FIG. 7) is required, as compared to energy storage devices which may be employed for operating a computer for a half hour or longer during a power outage. In fact, the demand on the battery 108 is sufficiently small so that the power card 24 is ready immediately to respond to another interruption of the primary power. Also, it is noted that all of the procedural steps for the freezing of the application program are accomplished automatically without any intervention on the part of the computer operator, it being unnecessary for the computer operator to provide even a single key stroke.

Resumption of the application program, at block 262, is explained in further detail in FIG. 10. Resumption is initiated at block 274 and passes to block 276 in which the computer operator is notified by the presence of the previously stored power-down signal that there has been an interruption in the primary power. The computer operator signifies a desire to resume operation of the application by means of a key stroke which activates the controller 66 to return the frozen data and instructions from the backup region of the nonvolatile storage medium to the active storage medium, as indicated in block 278. Thereafter, at block 280, the application program resumes running from the specific stage of operation which was present at the time of the power interruption.

Further details in the implementation of the invention are provided by the appended computer programs.

It is to be understood that the above described embodiment of the invention is illustrative only, and that modifications thereof may occur to those skilled in the art. Accordingly, this invention is not to be regarded as limited to the embodiment disclosed herein, but is to be limited only as defined by the appended claims.

What is claimed is:

1. A method of saving work in a computer during an interruption of primary power to the computer, the computer having a central processing unit (CPU) and a memory operatively coupled to the CPU, the memory including an active storage medium and a nonvolatile storage medium, the CPU being operative to produce data under control of a system program and an application program, said active and said nonvolatile storage media being suitable for storing portions of said system program and said application program and said data;

the method comprising the steps of:
loading up a power-down procedure into the computer upon booting-up of a computer operating system;
designating a backup region in said nonvolatile storage medium for receipt of data during power-down;
providing a computer work saving system including a backup power source, a sensor, an auxiliary memory and a controller interconnected between said auxiliary memory and said sensor;
connecting said saving system to the CPU of the computer; and
upon an occurrence of the interruption of primary power to the computer, sensed by the sensor, performing the following steps:
storing a powerdown signal indicative of interruption of primary power to the computer in said auxiliary memory;
activating the backup power source in response to said signal;
running the computer on backup power of said backup power source;
terminating a further running of said application program at a program stage in effect at the power-interruption;
transferring data, said application program, and contents of all operating memory at said program stage from said active storage medium to said backup region in said nonvolatile storage medium; and
disconnecting the backup power from the computer, and wherein, upon resumption of primary power and in response to a manually generated signal to resume operation of the computer, the method comprises further steps of:
reading the power-down signal;
returning the data and portions of the application program at said program stage from said backup region to said active storage medium; and
resuming a running of the application program from said program stage.

2. A method according to claim 1 wherein said active storage medium is a random access memory.

3. A method according to claim 1 wherein said nonvolatile storage medium is a magnetic disk.

4. A method according to claim 1 further comprising a step of recording the power-down signal indicative of the presence of the power interruption.

5. A method according to claim 1 wherein said active storage medium is a volatile memory.

6. A method according to claim 1 wherein said power down procedure is stored in a RAM.

7. A method according to claim 6 wherein only a portion of the power down procedure necessary for the computer to address the RAM during an interruption is loaded into the computer upon booting up.

8. A method according to claim 7 wherein the residual portion of a backup routine does not use operating system resources.

9. A method of saving work in a computer during an interruption of primary power to the computer, the method comprising steps of:
provided a computer work saving system including a backup power source, a sensor, an auxiliary memory and a controller interconnected between said auxiliary memory and said sensor;
connecting said system to the computer;
operating the computer on backup power of said backup power source upon an occurrence of the interruption of primary power sensed by said sensor;
terminating a further running of an application program by the computer, the terminating occurring at a program stage in effect at the power interruption;
transferring data, the application program and contents of all operating memory at said program stage from volatile memory of the computer to nonvolatile backup memory of the computer; and
subsequent to a resumption of the primary power to the computer, upon request by a user, returning the data and portions of the application program and the contents of all operating memory at said program stage from said backup nonvolatile memory to said volatile memory of the computer; and
resuming a running of the application program from said program stage.

10. A system for saving work in a computer during an interruption of primary power to the computer, the computer having a central processing unit (CPU) and a memory operatively coupled to the CPU, the memory including an active storage medium and a nonvolatile storage medium, the CPU being operative to produce data under control of a system program and an application program, said active and said nonvolatile storage media being suitable for storing portions of said system and said application program and said data, said system comprising
a sensor of the primary power, a backup power source, and a controller; said sensor activating said controller, upon interruption of the primary power, to replace the primary power with backup power from the backup power source, the controller including means for operating the computer to freeze the present states of the application program and of data employed with the application program,
said system further comprising a random access memory for storing a backup procedure to be implemented by said controller, said backup procedure including commands, said computer including means responsive to said commands for resumption of the application program upon resumption of the primary power.

11. A system as in claim 10 wherein said sensor, backup power source and controller are modular to enable at least one of said sensor, said backup power source and said controller to be integrated within other parts of the computer whereas remaining parts of the system are formed as plug-in boards into the computer.

12. A system according to claim 11 wherein said freezing is accomplished without assistance of the operator of the computer.

13. A system according to claim 10 wherein the computer includes means responsive to commands of said controller for transferring frozen data from said active storage medium to said nonvolatile storage medium.

14. A system according to claim 13 wherein said active storage medium is a volatile random access memory, and said nonvolatile storage medium is a magnetic disk.

15. A system according to claim 10 which is provided on an auxiliary card to be added to the computer.

16. A system according to claim 15 wherein said random access memory for said backup procedure is a part separate from standard, expanded, or extended memory so as to not interfere with any system resources.

17. A system according to claim 16 wherein said computer further comprises a data bus for transferring data and program instructions between said nonvolatile storage medium and said active storage medium during a running of the application program, said transfer of data being accomplished via said data bus.

18. A system according to claim 17 wherein said nonvolatile storage medium is provided with a predesignated backup storage region for receiving frozen data during said transfer.

19. A system according to claim 10 wherein said controller deactivates said backup power source upon completion of said transfer.

20. A system according to claim 10 wherein said backup power source includes a plurality of voltage regulators, a rechargeable battery, and a charger of the battery, said controller deactivating said charger and implementing electrical connection between said battery and said voltage regulators upon the interruption of the primary power.

21. A system according to claim 20 wherein said controller reactivates said charger to resume a charging of the battery upon resumption of the primary power.

22. A system according to claim 21 wherein each of said voltage regulators is individually actuatable by said controller.

23. A system according to claim 22 wherein the backup procedure stored in said random access memory is adapted for a type of the computer utilized.

24. A system according to claim 10 wherein said nonvolatile storage medium is a magnetic disk storing both the system program and at least a portion of the backup procedure for activation of the backup procedure upon a booting-up of the computer.

25. A method of saving work in a computer during an interruption of primary power to the computer, the computer having a central processing unit (CPU) and a memory operatively coupled to the CPU, the memory including an active storage medium and a nonvolatile storage medium, the CPU being operative to produce data under control of a system program and an application program, said active and said nonvolatile storage media being suitable for storing portions of said system program and said application program and said data;
the method comprising the steps of:
loading up a power-down procedure into the computer upon booting-up of a computer operating system;

designating a backup region in said nonvolatile storage medium for receipt of data during power-down;

providing a computer work saving system formed on a card insertable in the computer and including a backup power source, a sensor, an auxiliary memory and a controller interconnected between said auxiliary memory and said sensor;

connecting said saving system to the CPU of the computer; and upon an occurrence of the interruption of primary power to the computer, sensed by said sensor, performing the following steps:

storing a powerdown signal indicative of interruption of primary power to the computer in said auxiliary memory;

activating the backup power source in response to said signal;

running the computer on backup power of said backup power source;

terminating a further running of said application program at a program stage in effect at the power-interruption;

transferring data, said application program, and contents of all operating memory at said program stage from said active storage medium to said backup region in said nonvolatile storage medium; and disconnecting the backup power from the computer, and wherein upon resumption of primary power and in response to a manually generated signal to resume operation of the computer, the method comprises further steps of:

reading the power-down signal;

returning the data and portions of the application program at said program stage from said backup region to said active storage medium; and resuming a running of the application program from said program stage.

26. A system for saving work in a computer during an interruption of primary power to the computer, the computer having a central processing unit (CPU) and a memory operatively coupled to the CPU, the memory including an active storage medium and a nonvolatile storage medium, the CPU being operative to produce data under control of a system program and an application program, said active and said nonvolatile storage media being suitable for storing portions of said system and said application program and said data, said system being formed on an auxiliary card and comprising:

a sensor of the primary power, a backup power source, and a controller; said sensor activating said controller, upon interruption of the primary power, to replace the primary power with backup power from the backup power source, the controller including means for operating the computer to freeze the present states of the application program and of data employed with the application program, said system further comprising a random access memory for storing a backup procedure to be implemented by said controller, said backup procedure including commands, said computer including means responsive to said commands for resumption of the application program upon resumption of the primary power.

* * * * *